(12) United States Patent
Alexander

(10) Patent No.: US 7,765,794 B2
(45) Date of Patent: Aug. 3, 2010

(54) METHOD AND SYSTEM FOR OBTAINING EXHAUST GAS FOR USE IN AUGMENTING CRUDE OIL PRODUCTION

(75) Inventor: Wade J. Alexander, Owasso, OK (US)

(73) Assignee: NCO2 Company LLC, Tulsa, OK (US)

(*) Notice: Subject to any disclaimer, the term of this patent is extended or adjusted under 35 U.S.C. 154(b) by 840 days.

(21) Appl. No.: 11/333,848

(22) Filed: Jan. 18, 2006

(65) Prior Publication Data
US 2006/0218905 A1 Oct. 5, 2006

Related U.S. Application Data

(63) Continuation-in-part of application No. 10/195,604, filed on Jul. 15, 2002, now abandoned.

(51) Int. Cl.
*F01N 3/00* (2006.01)
(52) U.S. Cl. .................... 60/285; 60/274; 60/298; 60/299; 60/309
(58) Field of Classification Search ............... 60/274, 60/276, 285, 298, 299, 309, 621, 624; 423/213.5, 423/359, 437.1
See application file for complete search history.

(56) References Cited

U.S. PATENT DOCUMENTS

| | | |
|---|---|---|
| 1,868,755 A | 7/1932 | Mount |
| 1,945,407 A | 1/1934 | Adair et al. |
| 2,240,550 A | 5/1941 | Conlon Jr. |
| 2,825,408 A | 3/1958 | Watson |
| 3,000,707 A | 9/1961 | Barstow |
| 3,004,601 A | 10/1961 | Bodine |
| 3,100,528 A | 8/1963 | Plummer et al. |
| 3,137,344 A | 6/1964 | Wiemer |
| 3,232,885 A | 2/1966 | Henke |
| 3,381,523 A | 5/1968 | Nettles |
| 3,653,438 A | 4/1972 | Wagner |
| 3,808,805 A | 5/1974 | Miramontes |
| 3,908,762 A | 9/1975 | Redford |
| 4,324,291 A | 4/1982 | Wong et al. |

(Continued)

FOREIGN PATENT DOCUMENTS

EP 1226862 7/2002

OTHER PUBLICATIONS

PCT Patent Office, "Notificaiton of Transmittal of the International Search Report and The Written Opinion of the International Searching Authority," PCT Patent Office.

(Continued)

*Primary Examiner*—Tu M Nguyen
(74) *Attorney, Agent, or Firm*—Gable Gotwals

(57) ABSTRACT

A method and system of providing compressed low $NO_x$ exhaust gas for industrial purposes including for use in augmenting crude oil production including the steps of extracting exhaust gas from an engine consuming a controllable mixture of hydrocarbon fuel and air, compressing and cooling the exhaust gas to condense water therefrom, measuring the pH of the condensed water, employing the measured pH to adjust the ratio of the hydrocarbon fuel and air supplied to the engine to achieve a substantially neutral pH measurement and thereby obtain compressed exhaust gas having a low $NO_x$ content.

4 Claims, 3 Drawing Sheets

U.S. PATENT DOCUMENTS

| | | |
|---|---|---|
| 4,325,432 A | 4/1982 | Henry |
| 4,431,622 A | 2/1984 | Moss |
| 4,533,374 A | 8/1985 | Haag |
| 4,546,829 A | 10/1985 | Martin et al. |
| 4,593,763 A | 6/1986 | Burke |
| 4,656,831 A | 4/1987 | Budininkas et al. |
| 4,725,381 A | 2/1988 | Pinto |
| 4,891,939 A | 1/1990 | Brighenti |
| 5,185,139 A | 2/1993 | Krishnamurthy et al. |
| 5,232,049 A | 8/1993 | Christiansen et al. |
| 5,233,837 A | 8/1993 | Callahan |
| 5,410,873 A | 5/1995 | Tashiro |
| 5,693,121 A | 12/1997 | Callahan et al. |
| 5,953,907 A | 9/1999 | Kato et al. |
| 5,988,280 A | 11/1999 | Crawford et al. |
| 6,012,282 A | 1/2000 | Kato et al. |
| 6,039,116 A | 3/2000 | Stevenson et al. |
| 6,085,549 A | 7/2000 | Daus et al. |
| 6,240,725 B1 | 6/2001 | Scappatura |
| 6,266,605 B1 * | 7/2001 | Yasui et al. ................. 701/109 |
| 6,581,375 B2 * | 6/2003 | Jagtoyen et al. ............... 60/309 |
| 6,708,484 B2 | 3/2004 | Onodera et al. |
| 6,722,436 B2 | 4/2004 | Krill |
| 6,893,615 B1 | 5/2005 | Alexander |
| 7,389,639 B2 * | 6/2008 | Michalakos et al. ........... 60/309 |
| 2003/0160455 A1 | 8/2003 | Hu et al. |
| 2003/0221413 A1 | 12/2003 | Buglass et al. |
| 2006/0045801 A1 * | 3/2006 | Boyden et al. ................ 422/62 |

OTHER PUBLICATIONS

International Report on Patentability issued on Apr. 9, 2009 by the International Bureau of WIPO in corresponding PCT/US06/23574; 5 pages.

* cited by examiner

METHOD AND SYSTEM FOR OBTAINING EXHAUST GAS FOR USE IN AUGMENTING CRUDE OIL PRODUCTION

CROSS-REFERENCE TO PENDING APPLICATIONS

This is a continuation-in-part of U.S. patent application Ser. No. 10/195,604 filed Jul. 15, 2002 entitled "A Method And System For Providing Compressed Substantially $NO_x$-Free Exhaust Gas For Industrial Purposes" which is a continuation-in-part of U.S. patent application Ser. No. 09/681,601 filed May 4, 2001 entitled "A Method And System For Providing Substantially Water-Free Exhaust Gas", now U.S. Pat. No. 6,893,615.

CROSS-REFERENCE TO MICROFICHE APPENDIX

This application is not referenced to any microfiche appendix.

FIELD OF THE INVENTION

The present invention concerns a method of providing compressed substantially $NO_x$-free exhaust gas for augmenting crude oil production. More specifically, the present invention is a system for providing substantially dry $NO_x$-free exhaust gas from an engine that employs a mixture regulator to control the ratio of hydrocarbon fuel and air consumed by the engine wherein the mixture regulator is controlled in response to the pH of condensate water produced during compression of the exhaust gas.

BACKGROUND OF THE INVENTION

Most oil producing subterranean formations are characterized by pressurized gas. In some parts of the work hydrocarbon bearing formations have pressures sufficient to force liquid hydrocarbons (crude oil) to the earth's surface. In other parts of the world, the gas pressure is not sufficient to force liquid hydrocarbons to the earth's surface. However, in such formations, the presence of gas is nevertheless important since in many formations a gas drive is required to move liquid hydrocarbons from within the formation to the site of a producing well or wells.

As crude oil is extracted from a subterranean reservoir, the reservoir gas pressure decreases. As the gas pressure decreases, crude oil production rates usually fall. For these and other reasons, it has been found desirable in producing many subterranean formations to maintain gas pressure within the formations.

The characteristics of gas injected into a well can be critical. Water or free oxygen contained in gas can cause plugging of formations. Further water or free oxygen can result in bacteria growth that can plug a producing formation.

Ideally, gas injected into a reservoir to augment the production of liquid hydrocarbons should be water-free. Therefore, when treating gas prior to injection, a most important step is to remove substantially all water.

Perhaps even more important than dryness of exhaust gas to be injected into a reservoir to augment the production of hydrocarbons, it is important that the exhaust gas be as free as possible of nitrous oxide, usually referred to in the industry as "$NO_x$". When nitrous oxide is present in exhaust gas it inevitably comes into contact with water which can be any water vapor that is left within the exhaust gas after efforts are made to improve the dryness of the exhaust gas as much as practically possible, or water that is encountered in subterranean hydrocarbon-producing formations. When nitrous oxide gas encounters water, nitric acid is formed. Nitric acid is exceedingly deleterious to metal and particularly to iron, that is, steel, as used in casing, tubing, pump parts and so forth. Therefore, exhaust gas used to stimulate the production of hydrocarbons should be, to the extent possible, free of $NO_x$.

The present invention provides a process for generating substantially water-free and $NO_x$ free exhaust gas that is particularly useful for injection into hydrocarbon bearing formations.

Examples of the use of exhaust gas from an engine for industrial purposes and examples of the use of exhaust gas to augment liquid hydrocarbon production are found in the following United States patents:

| Patent Number | Inventor(s) | Title |
| --- | --- | --- |
| 1,868,755 | Mount | Dehydrator |
| 1,945,407 | Adair et al. | Process of Purifying Gases |
| 2,240,550 | Conlon, Jr. | Method of Retuning Gas to Gas-Producing Formations |
| 2,825,408 | Watson | Oil Recovery By Subsurface Thermal Processing |
| 3,000,707 | Barstow | Process For Generating Inert Gas |
| 3,004,601 | Bodine | Method and Apparatus for Augmenting Oil Recovery from Wells by Refrigeration |
| 3,100,528 | Plummer, et al. | Method for Using Inert Gas |
| 3,137,344 | Wiemer | Minimizing Loss of Driving Fluids in Secondary Recovery |
| 3,381,523 | Nettles | Method and Apparatus for Supplying Gas Under Pressure |
| 3,653,438 | Wagner | Method of Recovery of Petroleum Deposits |
| 3,908,762 | Redford | Method for Establishing Communication Path in viscous Petroleum-Containing Formations Including Tar Sand Deposits for Use in Oil Recovery Operations |
| 4,324,291 | Wong et al. | Viscous Oil Recovery Method |
| 4,325,432 | Henry | Method of Oil Recovery |
| 4,533,374 | Haag | Method for Reducing Air Pollution |
| 4,546,829 | Martin et al. | Enhanced Oil Recovery Process |
| 4,593,763 | Burke | Carbon Dioxide Well Injection Method |

-continued

| Patent Number | Inventor(s) | Title |
| --- | --- | --- |
| 4,891,939 | Brighenti | System for the Cryogenic Processing and Storage of Combustion Products of Heat Engines |
| 5,232,049 | Christiansen, et al. | Sequentially flooding a Subterranean Hydrocarbon-Bearing Formation with a Repeating Cycle of Immiscible Displacement Gases |
| 5,953,907 | Kato et al. | Method of Controlling An Engine Exhaust Gas System and Method of Detecting Deterioration Of Catalyst/Absorbing Means |
| 5,988,280 | Crawford et al. | Use of Engine Heat in Treating a Well Bore |
| 6,039,116 | Stevenson et al. | Oil and Gas Production with Periodic Gas Injection |

BRIEF SUMMARY OF THE INVENTION

This invention is a method and a system for providing substantially water-free exhaust gas useful for industrial purposes and particularly useful for injection into subterranean formations to augment the production of liquid hydrocarbons. The method includes the steps of: 1) extracting exhaust gas from hydrocarbon fuel consuming engine; 2) passing the gas from Step 1 through a catalytic converter; 3) cooling the gas from Step 2 to provide a cooled exhaust gas; 4) passing the cooled exhaust gas from Step 3 through a liquid separator by which entrained water is extracted to provide dry exhaust gas; 5) chilling the dryer exhaust gas from Step 4 to below the dew point temperature to cause water to condense out; 6) extracting the condensed water from Step 5 to provide substantially water-free exhaust gas; and 7) compressing the substantially water-free exhaust gas for industrial purposes such as for injecting into a hydrocarbon producing formation.

A system for practicing the method of this invention includes a hydrocarbon fuel consuming engine that produces exhaust gas. A catalytic converter is connected to receive the exhaust gas from the engine. A compressor/chiller is employed by which the exhaust gas from the catalytic converter is compressed and chilled below the dew point temperature to cause water vapor entrained therein to condense out, the condensed water being extracted to thereby provide substantially water-free exhaust gas that is compressed for injection into a subterranean formation.

This invention also provides a method of providing compressed substantially $NO_x$-free exhaust gas for industrial purposes. This method includes the steps of extracting exhaust gas from an engine consuming a controllable mixture of hydrocarbon fuel and air. Water is extracted from the exhaust gas. The pH, that is negative ion concentration, of the extracted water is measured. This pH measurement is used to regulate the ratio of hydrocarbon fuel and air consumed by the engine to minimize the level of $NO_x$ in the exhaust gas. The exhaust gas, having minimal $NO_x$, and having passed through a sequence of compression and cooling steps in which the exhaust gas is compressed and cooled below the dew point temperature thereof to cause entrained water vapor to condense out. The extracted water vapor is separated and after measuring the pH thereof is disposed of to provide substantially dry and substantially $NO_x$-free exhaust gas, which is then compressed so that it can be used industrially, such as for injecting into a producing oil-bearing formation.

A better understanding of the invention will be obtained from the following description and claims taken in conjunction with the attached drawings.

BRIEF DESCRIPTION OF THE DRAWINGS

FIG. 3 is substantially similar to the system and method illustrated in FIG. 2 with one important difference. In FIG. 2 the fuel/air mixture control that regulates the mixture of fuel and air that is consumed in the internal combustion engine is controlled by a $NO_x$ analyzer whereas in FIG. 3 a $NO_x$ analyzer is not employed. Instead, in FIG. 3 the fuel/air mixture is controlled in response to detected pH of water extracted from the exhaust gas. In FIG. 3 a system is shown using a plurality of air coolers and in which a pH monitor provides a measure of pH of water from each separator. Further, a pH monitor is provided for monitoring the pH of water collected in the disposal tank that receives water from all of the separators. Obviously it is not necessary to have a plurality of pH monitors—only one is necessary. FIG. 3 shows the various positions at which a pH monitor may be located in practicing the principals of the invention.

DETAILED DESCRIPTION OF THE PREFERRED EMBODIMENTS

Figure 1:
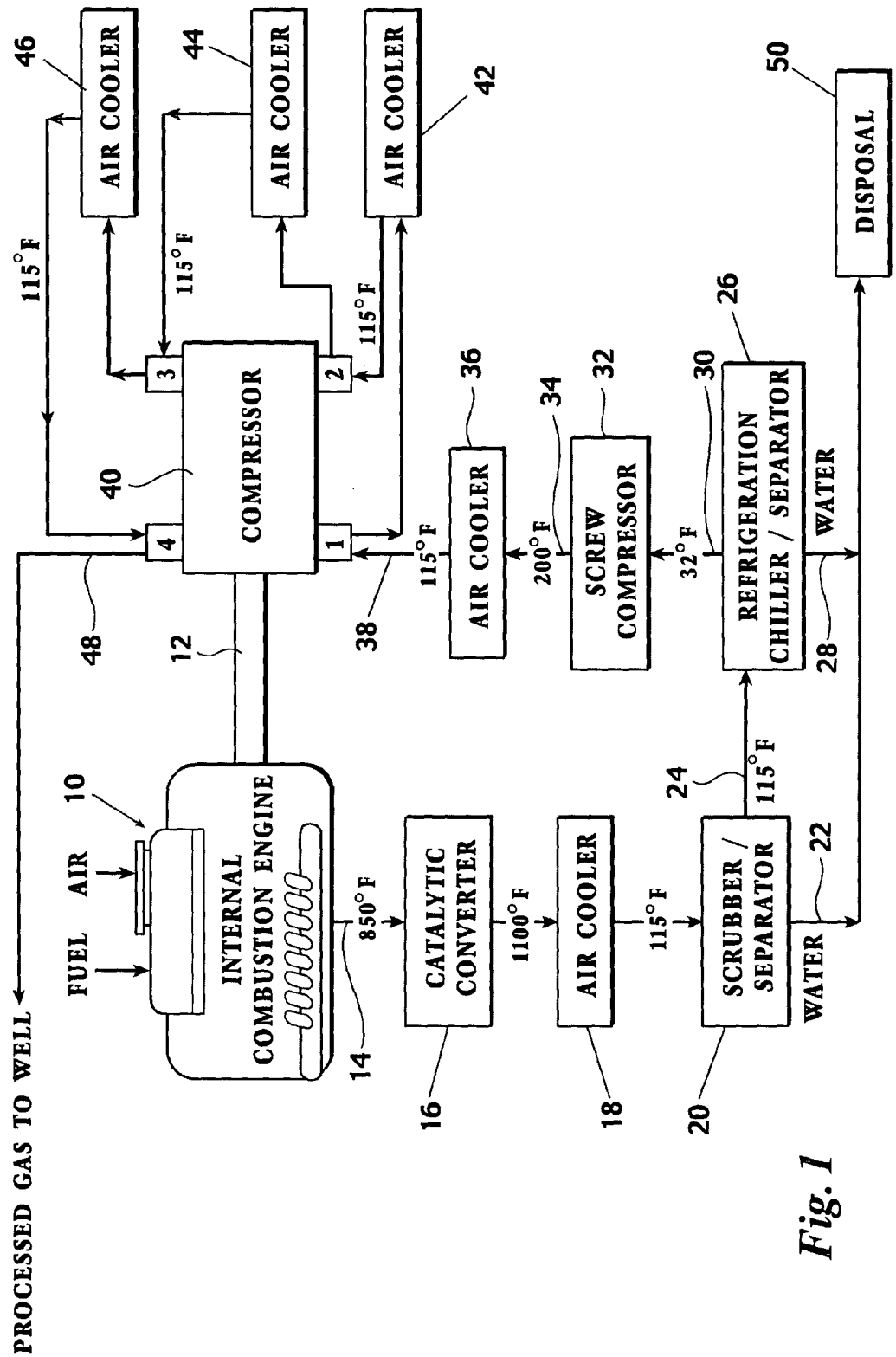
FIG. 1 illustrates a method and a system employing an internal combustion engine having a drive shaft connected to a multi-stage compressor. Exhaust gas from the engine is passed through a catalytic converter, cooled and then subjected to multiple steps of compression and cooling below the dew point temperature thereof. Condensed water is extracted to provide a substantially water-free exhaust gas consisting essentially of nitrogen and carbon dioxide ideally suited for compression and injection into an underground hydrocarbon producing formation.

Referring to the drawings, and first to FIG. 1, a system that can be used for practicing a method of this invention is shown. The system makes use of the exhaust gas output of an internal combustion engine, the engine being indicated by the numeral 10. Such an engine can be the kind utilized in an automobile, a truck or an industrial engine. The size of the engine will be determined by the quantity of gas required. If more gas is required than can be produced by a single engine, then multiple separate engines may be utilized. The fuel burned by engine 10 can be a hydrocarbon liquid such as gasoline, jet engine fuel, diesel fuel or so forth or the fuel may be a gas such as natural gas or gas derived from liquefied natural gas, such as propane, butane, etc. The engine 10 may be of the piston type as commonly used in automobiles and trucks or may be of the turbine type as frequently used for driving electrical generators. The engine 10 utilizes fuel mixed with ambient air that is combusted within the engine to produce energy output in the form of a rotating drive shaft 12. As a consequence of the combustion of the fuel and air within engine 10, exhaust gas is produced at an exhaust 14.

Gas from exhaust 14 is passed through a catalytic converter 16. In the catalytic converter, heated catalysts react with deleterious components of the exhaust gas to substantially neutralize such components to provide an output from the catalytic converter that is more environmentally acceptable.

The exhaust gas having passed through catalytic converter 16 is reduced to a lower temperature in an air cooler 18. From air cooler 18, the exhaust gas is fed into a scrubber/separator 20 in which any entrained water is separated with the water passing out through a discharge line 22 and the exhaust gas passing through a conduit 24. Next, a refrigeration chiller 26 cools the exhaust gas below the dew point temperature thereof and additional water is extracted from it, water passing out through a water drain 28 and the cooled dry exhaust gas through a pipe 30. A screw compressor 32 compresses the gas. As a consequence of compression, the temperature of the gas is raised. The warm gas passes by conduit 34 to the input of an air cooler 36 where the temperature of the gas is brought down. The output at 38 is then fed into the input of a multi-stage compressor 40, driven by drive shaft 12 from engine 10. In compressor 40, the dry exhaust gas is passed through multiple stages of compression. In the arrangement as illustrated, compressor 40 has four stages of compression with intermediate coolers 42, 44 and 46. Cooler 42 is between first compression stage one and second compression stage two; cooler 44 between compression stage two and compression stage three; and cooler 46 between compression stage three and compression stage four. Each of the coolers cools the compressed gas. The compressed gas at the output 48 of the fourth compression stage is substantially water-free and at an elevated pressure suitable to be used for industrial purposes. As previously stated, an example of an ideal use of the substantially water-free exhaust gas at output 48 is injection into a subterraneous hydrocarbon producing formation to maintain the pressure of the formation to thereby augment the production of liquefied petroleum.

Representative temperatures of the gas at various stages are indicated in FIG. 1. The gas at exhaust 14 of engine 10 is typically about 850° F. and is typically raised to about 1100° F. in catalytic converter 16. Air cooler 18 preferably reduces the temperature to about 115° F. The temperature of the gas passing out of scrubber/separator 20 is also preferably about 115° F. The temperature of the gas from refrigeration chiller/separator 26 is reduced to near the freezing point—that is, about 32° F. however the gas coming out of compressor 32 is typically about 200° F. This is reduced by air cooler 36 to about 115° F. and each of air coolers 42, 44 and 46 are designed and operated so that the exhaust gas emerging therefrom is at about 115° F. These temperatures are not critical.

Water that is extracted from the exhaust gas must be properly disposed of, therefore discharge line 22 from scrubber/separator 20 and drain 28 from refrigeration chiller/separator 26 are fed to a water disposal site 50. The water from disposal 50 can be injected separately into a non-producing subterranean formation or otherwise disposed of in a proper, environmentally acceptable manner.

The substantially water-free exhaust gas produced by the system and method of this invention, as illustrated in FIG. 1, is composed of about 85% nitrogen and 15% carbon dioxide. Thus the system, when used to provide gas that is injected back into a subterranean formation also reduces the amount of carbon dioxide that would otherwise pass into the atmosphere.

Figure 2:
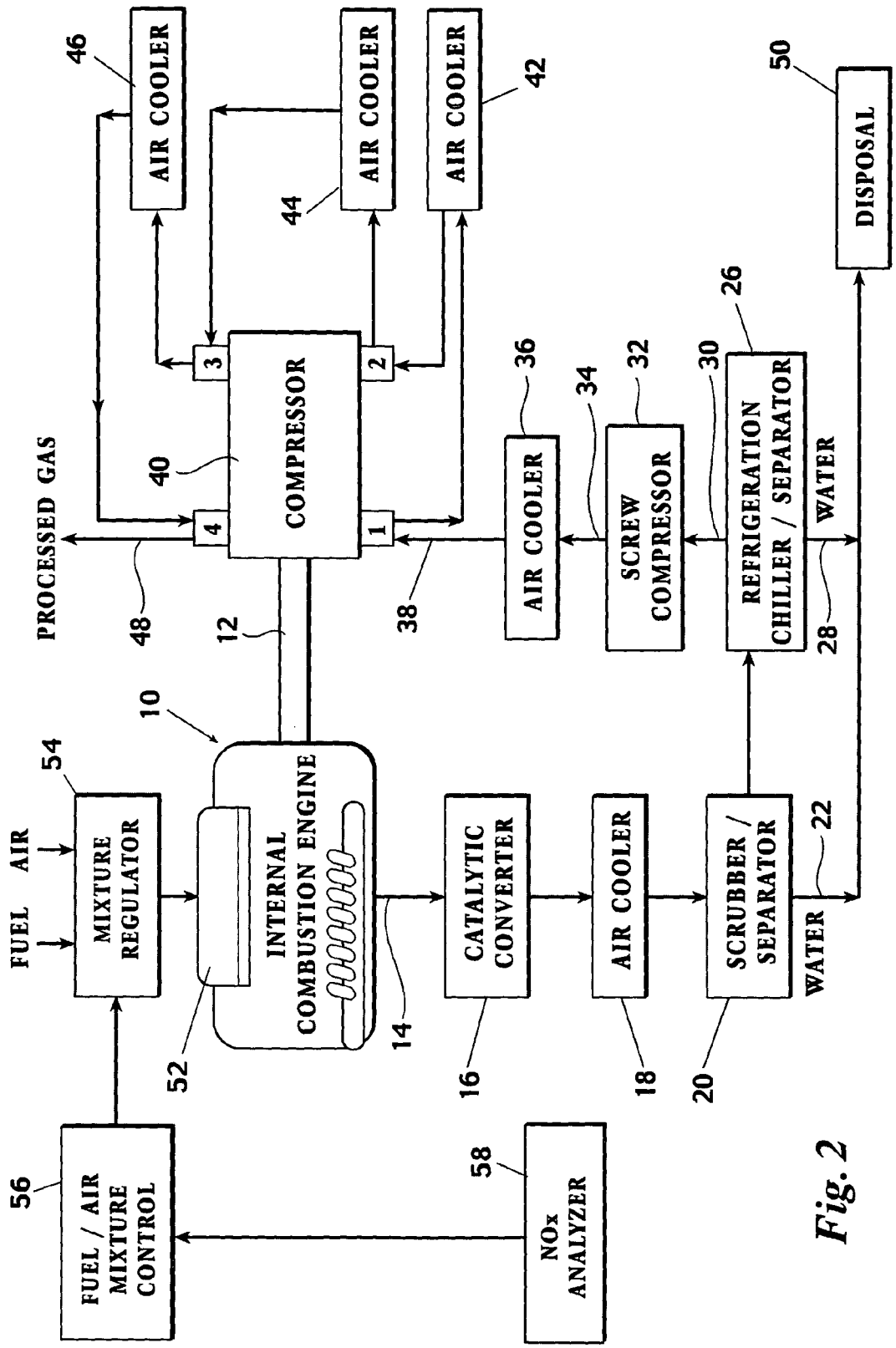
FIG. 2 illustrates a method and a system employing an internal combustion engine that runs on a mixture of hydrocarbon fuel and air, the engine having a drive shaft connected to a multi-stage compressor as in FIG. 1. Exhaust gas from the engine is passed through a catalytic converter. An instrument is used at this point to measure the level of $NO_x$ in the exhaust gas. Using this measurement the ratio of fuel and air consumed by the engine is regulated so that the $NO_x$ content of the exhaust gas passing out of the catalytic converter is reduced to a minimum. This substantially $NO_x$-free exhaust gas is then cooled and subjected to compression and chilling below the dew point temperature thereof to cause water entrained therein to condense out. The condensed water is extracted to provide a substantially $NO_x$-free and water-free exhaust gas consisting essentially of nitrogen and carbon dioxide that is ideally suite for compression and injection into an underground hydrocarbon producing formation.

FIG. 2 shows an alternate and improved embodiment of the invention. In the system of FIG. 2, all of the essential components of the system of FIG. 1 are employed as illustrating one example of a way of practicing the invention. Engine 10 is shown having a carburetion system 52 as is required on all internal combustion engines. The carburetion system 52 may be carburetor of the well-known type that draws liquid fuel in response to the passage of air through the carburetor and in which a mixture of atomized liquid fuel and air passes into an intake manifold. On the other hand, the carburetion system 52 may be of the fuel injection type that is currently employed on most automobile and truck engines or the type injection system long employed with diesel engines. In addition, the carburetion system 52 can be of the type that employs the use of natural gas in which natural gas is combined with air to produce the combustion mixture that is consumed by the engine.

The carburetion system 52 includes the use of a mixture regulator 54 that controls fuel and air input. The mixture regulator 54 is representative of a system that may be integral with carburetor system 52 that permits regulation of the ratio of fuel and air that is employed by engine 10 according to changing conditions and circumstances. Mixture regulator 54 is controlled or operated by a fuel/air mixture control 56 which in turn is governed by the output of a $NO_x$ analyzer 58.

$NO_x$ analyzer 58 is an instrument that is commercially available. It samples the output of catalytic converter 16 to determine the quantity of $NO_x$ in the stream that passes on to air cooler 18 and then to a scrubber/separator 20 and so forth, to the end of the system that ultimately produces the processed gas at outlet 48.

$NO_x$ analyzer 58 detects the presence of and amount of nitrous oxide in the exhaust gas appearing at engine exhaust 14. As previously explained, $NO_x$ is a very deleterious component of exhaust gas used for industrial purposes since it reacts with water to form nitric acid and as also previously explained, nitric acid is highly reactive with metal and therefore, attacks piping systems, valves, pumps, etc. This is particularly true when exhaust gas is utilized for injecting into wells. While the exhaust gas produced by the system of this invention is substantially water-free, as previously explained, particularly with reference to FIG. 1, nevertheless, many applications of exhaust gas take place where water is inevitably present. This is particularly true when exhaust gas is used for pressurizing a subterranean hydrocarbon-bearing formation since substantially all formations that include hydrocarbon, either crude oil or gas, include some water.

In any event, the system of FIG. 2 is intended to substantially reduce nitrous oxide in the exhaust gas. This is accomplished by the use of the $NO_x$ analyzer 58 that detects the presence of $NO_x$ in the exhaust gas. The signal from the analyzer 56 is applied to fuel/air mixture control 56 that controls mixture regulator 54 to regulate the ratio of fuel and air that is injected into carburetion system 52 of engine 10. The fuel/air ratio is usually referred to as the "fuel mixture". It has been discovered that by regulating the fuel mixture, the quantity of nitrous oxide produced in the exhaust gas can be controlled. By adjusting the fuel/air ratio, or fuel/air mixture, engine 10 can be operated such that $NO_x$ appearing at exhaust 14 and ultimately at the output of catalytic converter 16 is minimized. In this way, the dry and substantially water-free exhaust gas that appears as processed gas at outlet 48 is substantially free of $NO_x$. Thus, the objective of the system of FIG. 2 is to provide dry (essentially water-free) and substantially $NO_x$-free gas that can be used for industrial purposes, including, as an example, injecting into a hydrocarbon-bearing formation to augment the production of hydrocarbons.

Figure 3:
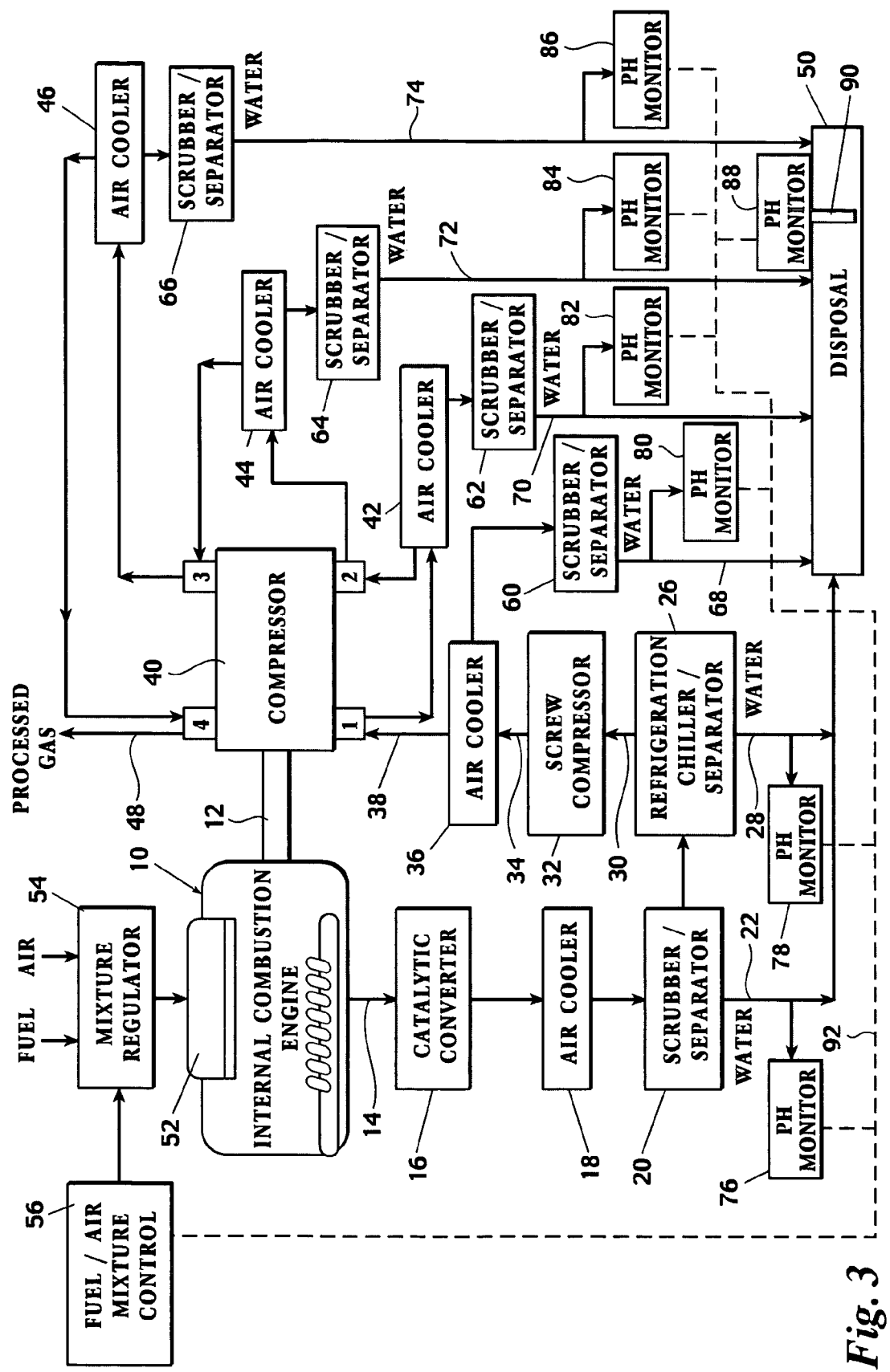
FIG. 3 is an illustration of a method and system employing an internal combustion engine that provides a source of exhaust gas that can be treated for use in industrial purposes.

FIG. 3 shows a different and improved system for obtaining exhaust gas for use in augmenting crude oil production. In this system the fuel/air mixture control 56 is operated in response to the detected pH of water condensed from the exhaust gas stream. In FIG. 3, six scrubber/separators are illustrated, that is, elements 20, 26, 60, 62, 64 and 66. Each of these has a pipe to drain water that is separated by the scrubber/separator. The drain pipes are indicated by numerals 22, 28, 68, 70, 72 and 74. Each of these drain pipes connects water that is condensed out of the exhaust gas to disposal 50. A pH monitor can be positioned in any one of these drain pipe locations to detect the pH of water condensed out of the exhaust gas. The detected pH is used to actuated the fuel/air mixture control 56. Specifically, to measure the pH in water in drain pipe 22 separated by scrubber/separator 20 a pH monitor 76 is employed. In like manner, a monitor 78 is connected to detect the pH of water in drain pipe 28; monitor 80 detects the pH of water in drain pipe 68; monitor 82 detects the pH in drain pipe 70; monitor 84 detects the pH of water in drain pipe 72 and monitor 86 detects the pH of the water in drain pipe 74. In addition, a pH monitor 88 can be provided to detect the condensate water collected in disposal 50. The pH monitor 88 may have a probe 90 that extends into the collected water.

By means of electrical signals generated from any one of the pH monitors 76, 78, 80, 82, 84, 86 and 88, an electrical signal can be sent by way of electrical conductors 92 to the fuel/air mixture control 56 to regulate the ratio of fuel in the air employed by internal combustion engine 10.

It has been discovered that when the fuel/air mixture supplied to engine 10 is controlled in a way so that the water condensed from the exhaust gas has a neutral pH then the $NO_x$ contents of the engine exhaust gas is at a minimum. Thus the process gas appearing at 48 will be substantially water and $NO_x$-free.

A single pH meter monitor is all that is required to practice the invention and it can be located at any one of the positions of pH monitors 76, 78, 80, 82, 84, 86 and 88. In addition, a combination of two or more of the pH monitors may be employed to provide the control signal to fuel/air mixture control 56.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claims, including the full range of equivalency to which each element thereof is entitled.

What is claimed is:

1. A method of providing compressed low $NO_x$ exhaust gas for industrial purposes including use in augmenting crude oil production comprising:
    (1) extracting exhaust gas from an engine consuming a controllable mixture of hydrocarbon fuel and air;
    (2) passing said extracted exhaust gas through at least one compression and cooling step by which water is condensed from the exhaust gas;
    (3) separating out said condensed water to provide substantially dry exhaust gas;
    (4) measuring the pH of said condensed water;
    (5) using measurements obtained from Step (4) to regulate the ratio of hydrocarbon fuel and air consumed in said engine so that said condensed water has a substantially neutral pH and thereby said exhaust gas has a low $NO_x$ content; and
    (6) compressing the dry and low $NO_x$ exhaust gas to provide compressed gas for industrial applications.

2. A method of providing compressed low $NO_x$ exhaust gas according to claim 1, including, after Step (1) of passing said exhaust gas through a catalytic converter before Step (2).

3. A system for providing substantially dry low $NO_x$ exhaust gas comprising;
    (1) a hydrocarbon fuel and air consuming engine that produces exhaust gas;
    (2) at least one compressor/cooler stage by which said exhaust gas from said engine is compressed and cooled to below the dew point temperature thereof to condense water therefrom providing condensed water that is disposed of;
    (3) a pH monitor for measuring the pH of said condensed water;
    (4) a mixture regulator for controlling the ratio of hydrocarbon fuel and air consumed by said engine; and
    (5) a mixture control for controlling said mixture regulator in response to the measured pH of said condensed water whereby said ratio is controlled to produce condensed water having a substantially neutral pH and corresponding compressed exhaust having a low $NO_x$ content.

4. A system for providing substantially dry and low $NO_x$ exhaust gas according to claim 3 including a catalytic converter in series with said engine through which exhaust gas from said engine passes prior to compressing and cooling the exhaust gas to condense water therefrom.

* * * * *